(12) United States Patent
Mihlhauser et al.

(10) Patent No.: US 12,049,417 B2
(45) Date of Patent: Jul. 30, 2024

(54) ALTERNATE METHOD TO INDUCE BIOLOGICAL TREATMENT INTO CONTAMINATED AREAS

(71) Applicants: Bobby Mihlhauser, Tyler, TX (US); Bo Higgins, Tyler, TX (US)

(72) Inventors: Bobby Mihlhauser, Tyler, TX (US); Bo Higgins, Tyler, TX (US)

( * ) Notice: Subject to any disclaimer, the term of this patent is extended or adjusted under 35 U.S.C. 154(b) by 310 days.

(21) Appl. No.: 15/929,992

(22) Filed: Jun. 2, 2020

(65) Prior Publication Data
US 2021/0371313 A1 Dec. 2, 2021

(51) Int. Cl.
C02F 3/34 (2023.01)
C02F 3/12 (2023.01)
C02F 3/20 (2023.01)
C02F 3/28 (2023.01)

(52) U.S. Cl.
CPC .......... *C02F 3/348* (2013.01); *C02F 3/1205* (2013.01); *C02F 3/1278* (2013.01); *C02F 3/20* (2013.01); *C02F 3/2806* (2013.01); *C02F 2209/08* (2013.01); *C02F 2209/10* (2013.01); *C02F 2209/14* (2013.01); *C02F 2305/06* (2013.01)

(58) Field of Classification Search
CPC .......... C02F 3/348; C02F 3/1205; C02F 3/12; C02F 3/128; C02F 3/20; C02F 3/28; C02F 2203/004
USPC ........................................ 210/160, 205, 620
See application file for complete search history.

(56) References Cited

U.S. PATENT DOCUMENTS

| | | | |
|---|---|---|---|
| 6,335,191 B1 * | 1/2002 | Kiplinger | C12M 29/18 435/813 |
| 2010/0193430 A1 * | 8/2010 | Whiteman | C02F 3/28 210/610 |

* cited by examiner

*Primary Examiner* — Claire A Norris
(74) *Attorney, Agent, or Firm* — Catherine Chesley Goodgion

(57) ABSTRACT

This invention relates to apparatus, methods and applications for treating wastewater, and more particularly to a technique of biological processes that integrates lowering the levels of effluent pollutants and reducing accumulated sludge volume from wastewater. This invention further relates to apparatus and methods for using a blend of non-pathogenic microbes, spores, unicellular organisms, and enzymes on-site at a wastewater treatment facility to rapidly, ecologically, and cost-effectively solve numerous contaminant issues common in wastewater.

15 Claims, 8 Drawing Sheets

1. Filtration System
2. Water In Pump
3. Micro Pump Out
4. Tank 1 Air Compressor
5. Bioreactor Tank 1
6. Tank 2 Air Compressor
7. Bioreactor Tank 2
8. Control Panel
9. Carbon Source
10. Nutrient Source
11. Microbial Seed
12. DO Probe (if needed)
13. Moisture and pH Probe (if needed)

ALTERNATE METHOD TO INDUCE BIOLOGICAL TREATMENT INTO CONTAMINATED AREAS

BACKGROUND OF THE INVENTION

Wastewater derives from a variety of different sources including ordinary living processes, commercial sources, and domestic sources. Wastewater treatment facilities are designed to enhance and catalyze the natural process of the breakdown of contaminates under controlled conditions.

Wastewater treatment facilities operate both physical and chemical processes to remove pollution and contaminated materials in the wastewater. After treatment concludes, soluble and insoluble organic material remains in the wastewater. The remaining organic material must be controlled at certain levels or it can quickly become too highly concentrated with contaminates that are dangerous to the environment. It is well known in the art that one process for the biological control of this organic material is using microorganisms to convert the organic materials into nutrients ingested by the microorganisms.

Microorganisms use contaminates as a food source and naturally reduce or eliminate these undesirable contaminates from the wastewater. Wastewater often contains various levels of these contaminates including phosphorus, nitrogen, sodium, potassium, iron, calcium, fats, sugars, and proteins. Microorganisms breakdown the organic matter in the contaminated wastewater and digest the nutrients as a food source. The introduction of certain microorganisms to the wastewater can dramatically reduce the amount of contaminates in the wastewater.

Many microorganisms naturally inhabit the wastewater. However, these microorganisms alone do not remove enough waste from the water and require additional non-indigenous microorganisms to remove the desired amount of contaminates from the water. The process of adding these additional exogenous microorganisms typically requires several weeks to reduce the amount of contaminates in the wastewater. Some of the current microbial products sold in the market are designed to address specific issues but lack an overall effectiveness to curb the entire spectrum of contaminates that need to be treated in order to control the pollution problems. Therefore, there is a need for a highly concentrated blend of microorganisms that feed on commonly found contaminates in wastewater to successfully to treat wastewater.

Wastewater is commonly stored by the municipal in a government owned lagoon system such as a single pass lagoon system. Untreated lagoon systems contain contaminates such as fats, oils, solids, *E. coli*, ammonia, and numerous additional pollutes. Dangerous levels of contaminates must be treated to safely maintain a water system for the general public's wellbeing, the residents of the local community's wellbeing, and the wellbeing of the environment as a whole. Municipalities and cities are charged with maintaining safe lagoons and are severely fined for lagoons that are out of compliance. Smaller cities and municipalities cannot afford these fines and penalties due to their limited budgets and must find an economical solution to control the contaminates in the wastewater to continue operating safely.

The Environmental Protection Agency estimates that between 10 and 20 percent of small community wastewater treatment facilities in the United States are not operating properly and therefore, are out of compliance which puts them at risk of incurring fines and penalties. Manpower, equipment, treatment options, and treatment facilities are limited resources for the rural communities. Rural communities do not have the resources to install and maintain expensive wastewater treatment operations. As a result, the rural communities must minimize operation costs, maintenance requirements and find cost effective treatments for wastewater contamination control in order to stay in compliance and prevent an environmental catastrophe.

Therefore, an immediate need exists for an economical biological solution that is adapted to produce and provide a highly saturated microbe mixture that greatly decreases contamination in wastewater quickly, economically, and efficiently.

Objects and Features of the Invention

A primary object and feature of the present invention is to provide a highly concentrated biological apparatus, method and application for treating wastewater. A further primary object and feature of the present invention is to provide a bioreactor concentrated blend adapted to remove pollutants from wastewater.

It is a further object and feature of the present invention to provide a novel biological system comprising methods of manufacture, methods of use, and methods of altering the length of growth cycles of microbes.

A still further object of the present invention is to provide a simplified, streamlined, and uncomplicated biological method of manufacture, methods of use, and methods of altering the growth cycles of microbes.

It is a further object and feature of the present invention to provide a biological concentrated blend comprising the desired targeted non-pathogenic microbes, spores, unicellular organisms, and/or enzymes that is vastly superior in efficacy to all other microbial solutions currently on the market.

A still further object of the present invention is to provide an improved biological control blended solution that does not require on-site manufacture but can be manufactured on-site based on user preference. It is a further object and feature of the present invention to allow a choice of growing microbes onsite or offsite of the treatment facility based on preference or resources available onsite.

It is a further object and feature of the present invention to economically inoculate an abundance of microbes to quickly solve numerous treatment problems while eliminating the need for overly complicated required monitoring equipment.

It is a further object and feature of the present invention to provide a biological system comprises methods of manufacture, methods of use, methods of sales, and methods of rapidly growing concentrated solutions comprised of non-pathogenic microbes.

A further primary object and feature of the present invention is to provide an alternative treatment method from the commonly used complicated procedure that requires extensive data collection and analysis before any treatment may commence. It is a further object and feature of the present invention to provide a universal concentrated wastewater treatment solution that produces dramatically improved results than current treatment options on the market.

A further primary object and feature of the present invention is to provide a biological treatment system that is efficient, inexpensive, and easy to administer. A still further primary object of the present invention is to provide an alternate method to induce biological treatment into contaminated areas.

SUMMARY OF THE INVENTION

The apparatus and method of the present invention provides a highly concentrated biological application for treating wastewater by injecting massive quantities of non-pathogenic microbes, spores, unicellular organisms and/or enzymes into a given wastewater environment. The present invention comprises integrated biological processes and novel bioreactor systems. Specifically, this invention comprises an integrated biological treatment process for the removal of organic material or BOD, suspended solids, Nitrogen, Phosphorus, and other contaminates from water and wastewater.

This invention relates to apparatus, methods and applications for treating wastewater, and more particularly to biological processes lowering the levels of effluent pollutants and reducing accumulated sludge volume from wastewater. It is the objective of this invention to provide all the necessary components to successfully produce a novel approach to an efficient biological solution and biological system.

Traditional bioreactor systems frequently used in the market place contain sophisticated multi-step methods of speeding up or slowing down the cycle time to incubate the microbes along with highly complicated systems that require substantial time monitoring, evaluating, and measuring to determine the proper bioreactor system to implement. Additionally, these common systems require extensive monitoring, specialized expensive equipment, time, and complicated data analysis. The current invention eliminates the multifarious methods involved in these overly complicated systems and instead streamlines the preparation of a biological blended solution, method and application for an efficient universal concentrated application and use.

The present invention abridges the generally used process of manipulating cycle times in the current industry. The present invention rapidly speeds up the microorganism growth cycle by mixing grown microbes with microbes still in the seed phase which causes the overall growth time to significantly decrease.

The present invention eliminates the requirement or preferred method of monitoring and controlling through an automated process and instead can be used to treat wastewater onsite manually without the required expensive automated process equipment. Alternatively, if the user prefers to monitor, control, and automate the delivery system, the present invention can be tailored for that multi-step system but the choice to use the automatic system is again not required for the present invention. The present invention apparatus and methods of operation may be customized to fit user's preferences.

The present invention may also be designed for additional application sites in addition to lagoons and wastewater sites. User can select treatment location or site and customize the biological solution needed for the particular site. For example, treatment location may be a land-based site where the biological solution could be adjusted according to the PH of the treatment site.

The present invention extensively improves the efficacy of the current biological treatment options on the market. Moreover, the present invention is inexpensive and comparatively easy to use while solving various treatment problems rapidly.

The present invention in a novel apparatus and method, treats wastewater with biological remediation via microbial saturation. The present invention removes sludge, ammonia, phosphorous, lowers TSS and other contaminates all in the same application.

This invention has several features; no single one of them is solely responsible for its desirable attributes. By no means limiting the scope of the invention as expressed by the information, which follows, the inventions more features that are prominent will now be discussed briefly. After reviewing the summary and detailed description, one will understand how the features of this invention provide its benefits, which include providing an alternate method to induce biological treatment into contaminated areas.

DETAILED DESCRIPTION

Figure 1:
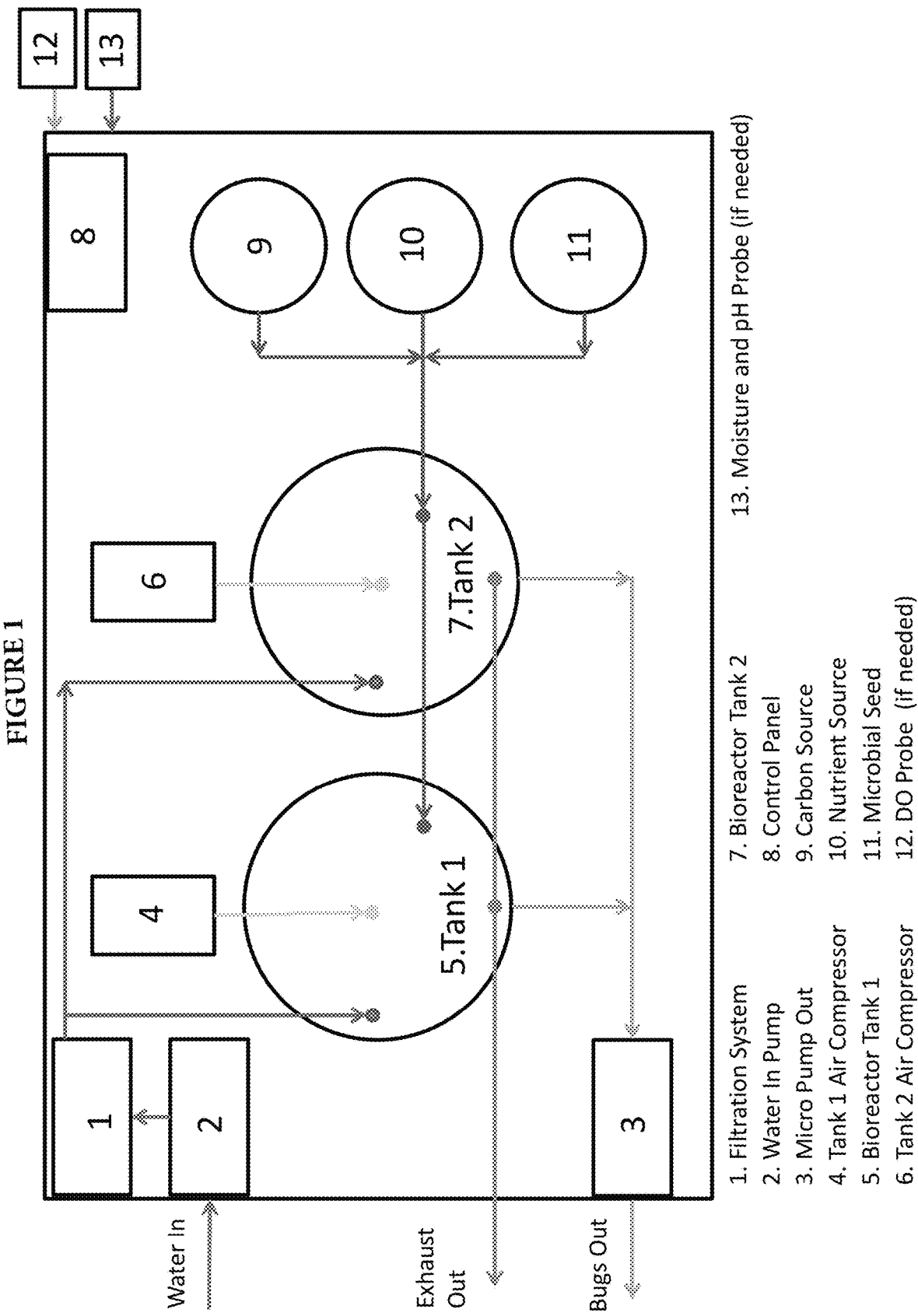
FIG. 1 is a diagram of the fermentation process.

The apparatus and method of the present invention provide a fast, predictable, efficient, and economical means of treating wastewater. Environmental regulations strictly control the type and amount of allowable pollutants in wastewater in an effort to reduce introduction of pollutants into the environment. The specifics of these regulations vary from state to state in the United States but all carry significant fines and fees if a wastewater facility is found out of compliance. Most municipalities and cities are operating on finite budgets so that any fine accessed against their wastewater treatment facility would be greatly distressing. Maintaining an environmentally safe treatment facility while staying in compliance with the regulations to avoid penalties and fines is not only desirable but essential for the community as a whole.

One aspect of the present invention is the novel inoculation of the concentrated solution of the most effective indigenous and exogenous microorganisms into the wastewater for rapid treatment. Wastewater facilities nationwide are plagued with extremely strict regulatory standards that leave little room for error. Once a treatment facility is in danger of being out of compliance, immediate treatment is critical to avoid any kind of punitive consequence. Prompt treatment in order to avoid an environmental catastrophic event is essential not only for the treatment facility but for the safety and well-being of the general public.

Commercially available wastewater treatment products presently used in the industry that contain microorganisms often create secondary problems when introduced to treatment facilities that require additional treatments. For example, if a commercial product injects exogenous or indigenous microbes that begin to form long chains or morph into a biomass, these filamentous microbes can dominate the wastewater and create a secondary problem of sludge bulking or foaming that now requires treatment. In order to treat the secondary problem created by the first treatment, the wastewater treatment facility must purchase additional treatment solutions to combat and control the secondary problem to stay in compliance. The present invention does not require any additional treatment of supplemental nutrients due to sludge bulking or create any secondary issues that require treatment. The present invention additionally is non-pathogenic that does not damage humans, pipelines, or aquatic life.

Another aspect of the present invention is the fermentation process used to grow the microbes. Any standard fermentation apparatus comprising a single fermentation tank with gas transfer system and mixing capability is appropriate. A carbon source, nutrient source, microbes, and microbial seed are injected into the bioreactor tanks to feed and grow the desired concentration of microbial saturation. This process can be done on-site, off-site, manually, automatically, or remotely according to user preference.

Another aspect of the present invention is the treatment of wastewater through biological remediation by saturation of a mixture of microbes, spores, unicellular organisms and enzymes. One with ordinary skill in the art can determine what microbes are used in the mixture. The current invention's novel approach is the effective dosage of microbes, spores, unicellular organism and enzymes compared to concentrations currently used in the market.

The present invention greatly increases the concentration level of microbes to greatly improve the efficacy of its wastewater treatment. The microbes are infused to a saturation level of optimal microbes in order to facilitate bio remediation.

Applicants disclose one example of the findings of serial dilution to determine the Colony-Forming Unit (CFU) count of viable bacterial in the sample of the current invention. Bacteria were allowed to grow for 36 hours in aerobic conditions with ample nutrient supply. Samples of the dilution were drawn and evaluated at 24 and 36 hours respectively. Three samples of 10 µl each were removed from each serial dilution vial. Petri dishes were prepared with lysogeny broth and agar for growth analysis. Data was taken at multiple wavelengths on the spectrometer as well as pH readings for additional information.

The results after 24 hours are as follows:

|  | 100% Solution | 50% Solution |
| --- | --- | --- |
| 610 ABS | 2.129 | 1.491 |
| 560 ABS | 2.052 | 1.381 |
| 520 ABS | 2.508 | 1.715 |
| 420 ABS | 3.863 | 2.515 |
| Turbidity | | |
| 100% | +++ FAU | |
| 50% | 625 FAU | |

Bacteria Count after 24 hours where in TMC is too many to count and TFC is too few to count.

| | Count | CFU*/ml |
| --- | --- | --- |
| 0 | TMC* | — |
| −1 | TMC | — |
| −2 | TMC | — |
| −3 | TMC | — |
| −4 | TMC | — |
| −5 | 93/3 = 31 | 3.1e8 |
| −6 | TFC* | — |
| −7 | TFC* | — |

The results after 36 hours are as follows:

|  | 50% Solution | 25% Solution |
| --- | --- | --- |
| 610 ABS | 1.349 | 0.814 |
| 560 ABS | 1.266 | 0.775 |
| 520 ABS | 1.619 | 1.024 |
| 420 ABS | 2.426 | 1.525 |
| Turbidity | | |
| 50% | 561 FAU | |
| 25% | 321 FAU | |

Bacteria Count after 36 hours where in TMC is too many to count and TFC is too few to count.

| | Count | CFU/ml |
| --- | --- | --- |
| 0 | TMC | — |
| −1 | TMC | — |
| −2 | TMC | — |
| −3 | TMC | — |
| −4 | TMC | — |
| −5 | 16.3/3 = 5.4 | 5.4e8 |
| −6 | TFC | — |
| −7 | TFC | — |

The data demonstrates that the peak of the growth curve was surpassed before the 36 hour sample was taken. The 24 hour sample gives the true CFU of the sample at the $10^{-5}$ dilution ratio. 31 CFU/$10^{-5}$=3,100,000 CFU per 10 µl. Converting from 100 to ml yields 3,100,000 CFU×10+$^{2}$=310,000,000 CFU/ml. Converting this metric unit to the SI unit of ounces (1 oz=29.57 ml) yields: 310,000,000 CFU/ml×29.57 ml/oz=9,170,000,000 CFU/oz. Therefore, averaging the three samples gives 31 CFU resulting from the conversion process.

Applicants disclose, as demonstrated in Appendix A, the present invention can obtain concentrations of 9,170,000,000 CFU/ounce. This can on average emit $5.87 \times 10+^{+14}$ CFU's per 500 gallon infusion. Concentrations currently on the market do not contain the saturation level of microbes as in the present invention and furthermore teach away from using any similar level of saturation.

Applicants disclose, as illustrated in FIG. 1, a bioreactor that houses all of the necessary components to produce highly concentrated biological solutions in multiple novel control approaches.

In general, water enters the bioreactor system via water in pump 2 and travels through any standard filtration system 1 that is commonly used in the art. The filtration system 1 removes any debris or pollutants including chlorine before entering either tank #1 5 or tank #2 7. Water 2 is moved into the tanks 5, 7 by a microcontroller, pumps, transfer lines, and a set of solenoid valves. As the water 2 enters a tank 5, 7 a predetermined amount of carbon source 9, nutrient source 10, and microbial seed 11 are injected into the tank 5,7 and mixed by any standard mixing apparatus. The inoculum comprising microbial seeds 11, nutrient source 10, and water will only be injected by transfer line and pump into the tanks 5,7 when needed.

Each tank 5,7 also houses an air compressor 4,6 that delivers air to the tank 5,7 which is injected by transfer lines into the solution as needed. The bioreactor system FIG. 1, can produce both anaerobic solution and aerobic solution based on the desired treatment application. If aerobic solution is desired for the treatment solution, the air compressor system 4,6 delivers continual air that is injected into the solution. If anaerobic solution is desired for the treatment solution, the air compressor 4,6 is shut off so that no air is injected into the solution.

Each tank 5,7 contains an arrangement of solenoid valves and pump that allow the entry and exit of solution through transfer lines. Each tank 5,7 also contains a sensor to determine the level of fluid which is sent to the microcontroller for monitoring. Each tank 5,7 additionally contains a piping system that allows air to exhaust outside.

All of the components in FIG. 1, can be controlled with automation on-site. Additionally, all of the components in FIG. 1, can be monitored and controlled from offsite remote locations all over the United States using the latest cellular technology available. This technology is readily available as a commercial product known as Category M1 (Cat M1). This technology is a cutting edge cellular technology specifically designed for machine-to-machine communications that implement a low-power interface. The actual embodiment many contain any monitoring apparatus commonly known in the art that allows machine-to-machine communications if monitoring is desired. The present invention comprises several variations that can be altered according to user desire. The examples outlined here are not an exhaustive list of the apparatus but are given as examples to demonstrate common uses.

The present invention uses a novel technique of growing the treatment mixture of non-pathogenic microbes, spores, unicellular organism, and enzymes in the bioreactor as illustrated in FIG. 1. Industry standard growth techniques typically grow batches of treatment microbes from microbial seeds. This traditional growth cycle is dependent on the time required for the seeds to grow. While there are complicated ways to speed up or slow down the microbial growth phase cycle time commonly known in the art, the present invention takes a novel approach at speeding up the growth phase cycle time rate by using a mixture of grown microbes and microbial seeds instead of only suing microbial seed in the bioreactor tanks 5,7 during the fermentation process.

For demonstration, to rapidly grow a new treatment batch with desired concentration of at least 3,200 times larger in volume by unit than the primary concentration of microbial mixture, the tanks 5,7 begin the fermentation process with fifty gallons of grown microbes already in the tanks 5,7. Water 2 is moved into the tanks 5, 7 by a microcontroller and a set of solenoid valves. As the water 2 enters a tank 5, 7 a predetermined amount of carbon source 9, nutrient source 10, and microbial seed 11 are injected into the tanks 5,7. The microbial seeds 11 will only be injected into the tank 5,7 when needed as grown microbes remain in the tank from previous cycles. This process yields the desired secondary concentration of the treatment batch of microbes blend much faster than the traditional growth process of growing a sufficient number of generations from seeds and allows a batch to be provided at the point of application for wastewater treatment rapidly.

The grown microbial mixture produces a treatment batch containing a higher concentration of microbes than the primary concentration of microbes wherein the secondary treatment batch is at least 3,200 times larger in volume by unit than the primary concentration of microbes. The secondary treatment batch avoids the need for a growth phase of biomass of microbial mixture in the wastewater and avoids the need for application of additional supplemental nutrients to the wastewater resulting in significantly lower pollutants in the effluent stream compared to the influent stream.

As shown in the previous demonstration, it is possible to grow more than one batch of saturated inoculum in one day depending on the generation growth time of the organisms used in the treatment batch and by beginning the cycle with a predetermined volume of grown microorganisms. The ability to grow more than one batch per day reduces the amount of treatment batch that must be stored to reach the desired volume of treatment batch when a large volume of treatment batch is needed for a large body of wastewater. Additionally, dependent on the volume of wastewater that requires treatment, the number of tanks 5,7 can also vary based on the treatment volume needed. Increasing the number of tanks 5,7 allows greater volume of batch production in a shorter amount of time.

The two tanks 5,7 in FIG. 1 house the fermentation process. The fermentation process is shown in FIG. 1 in two tanks 5,7 but can be altered based on user's desired amount of treatment solution, space available at growth site, or available resources. The addition of tanks 5,7 to the example reactor in FIG. 1. will increase the amount of treatment batch yielded at the end of the growth phase and minimize the time needed to grow the desired amount of treatment batch. Increasing the number of tanks and decreasing the growth phase time will dramatically increase the efficiency of the entire biological process along with reducing time and costs of both production and application.

Additionally, FIG. 1 can be installed on-site, on a remote location, on a moveable trailer, or anywhere the user desires. Depending on the climate, the user may desire to install the fermentation system on site to eliminate transportation costs, delivery issues, and other problems that come with transporting the treatment batch. However, some remote locations may not be suitable or make financial sense to install the fermentation system on site making the best option a remote location. Because the fermentation system can be manually, remotely, or automatically controlled, the user may select the best option for the user.

Other systems currently on the market are not flexible like the present invention and require multiple tanks, expensive equipment, cleaning equipment, and a variety of other issues due to the complexity of their fermentation batch method and required monitoring systems. The present invention eliminates the complex process, machinery, equipment and pre-treatment analysis that plagues the current treatments on the market. The present invention provides a simple saturated solution that streamlines the treatment process so that a wastewater facility without the latest and greatest expensive equipment can quickly and economically treat their wastewater facility with the best treatment option available.

One embodiment of the present invention is the standardized concentrated amount of non-pathogenic microbes, spores, unicellular organisms and enzymes in a treatment batch for wastewater. This standardized treatment batch comprises the non-pathogenic microbes of differing species, spores, unicellular organisms and enzymes that reduce the spectrum of pollutions on the list of government regulations for wastewater. Another embodiment of the present invention is to design and inoculate a saturated treatment batch based on the individual treatment needs of wastewater as determined by analyzing the contaminates in a particular body of wastewater.

Basing the saturated treatment batch on a particular wastewater site, a dissolved oxygen probe (DO probe) may be used to determine the concentration of oxygen in aqueous solutions in the field. The DO probe is inserted into the lagoon, wet well, pump station or any body of water with contaminates to monitor the level of dissolved oxygen in the water. Monitoring and analyzing the particular site's wastewater problems that need to be address will direct the optimal type of microbes used in the saturated treatment batch.

An example of a selective treatment batch is injecting aerobic bacterial such as *Bacillus* when the dissolved oxygen level determined to be too high or is typically above 6-8 ppm. *Bacillus* species are a Gram positive rod-shaped microbe, which form spores when exposed to non-ideal conditions. A person skilled in the art understand why these microbes in particular would be effective upon the application to the wastewater site and the characteristics of the microbes effective in treating that pollutant.

One embodiment of the composition includes component A, aerobic species in an amount of 10% to 40% by seed volume, or more preferably 20% to 50% by seed volume, or even more preferably 30% to 100% by seed volume. Inclusion of component A in an amount of the foregoing ranges provided progressively higher rates of biological growth in aerobic conditions which will correspond to faster contaminant removal.

If after treating the particular site the dissolved oxygen diminishes to 2-6 ppm, then a facultative species may be the desired microbe to treat the wastewater. If the dissolved oxygen is completed depleted to 1 ppm or zero, then the desired microbe would be an anaerobic species. The saturation of microbes in the individualized site specific batch, is tailored to the site specific treatment needs based on the data analyzed should the user desire to tailor the treatment microbes.

One embodiment of the composition includes component B, facultative species in an amount of 10% to 40% by seed volume, or more preferably 20% to 50% by seed volume, or even more preferably 30% to 100% by seed volume. Inclusion of component B in an amount of the foregoing ranges provided progressively stronger rates of biological growth in limited DO conditions which will correspond to faster contaminant removal.

One embodiment of the composition includes component C, anaerobic species in an amount of 10% to 40% by seed volume, or more preferably 20% to 50% by seed volume, or even more preferably 30% to 100% by seed volume. Inclusion of component C in an amount of the foregoing ranges provided progressively stronger rates of biological growth in zero DO conditions which will correspond to faster contaminant removal.

The site monitoring of the wastewater pollutions for the individualized saturation treatment batch may be monitored and controlled onsite, remotely or by automation. Data from onsite sensors transmit information to a remote computer or on-site computer for analysis. This monitoring may also utilize the Cat M1 machine-to-machine communication. Automated monitoring allows monitoring without the need for someone to physically go onsite for data collection. However, automated monitoring requires a backup plan if the automated monitoring apparatus fails.

If the DO probe malfunctions, monitoring can switch to manual mode to continue to collect data. Alternatively, the database of stored data prior to the DO probe failure could be used to determine an average of application frequency and species of microbes used over a date range when the DO probe was functioning properly. This data could be replicated as a control method and used until the DO was repaired and fully functioning again.

Example 1. Kingdom City, Missouri ran a clinical trial of the present invention on the City's municipal wastewater treatment plant. Kingdom City's existing Missouri State Operating Permit (MSOP) was expiring and the new MSOP discharge limits for Kingdom City were becoming more inclusive and more stringent than those of the current MSOP.

Figure 2:
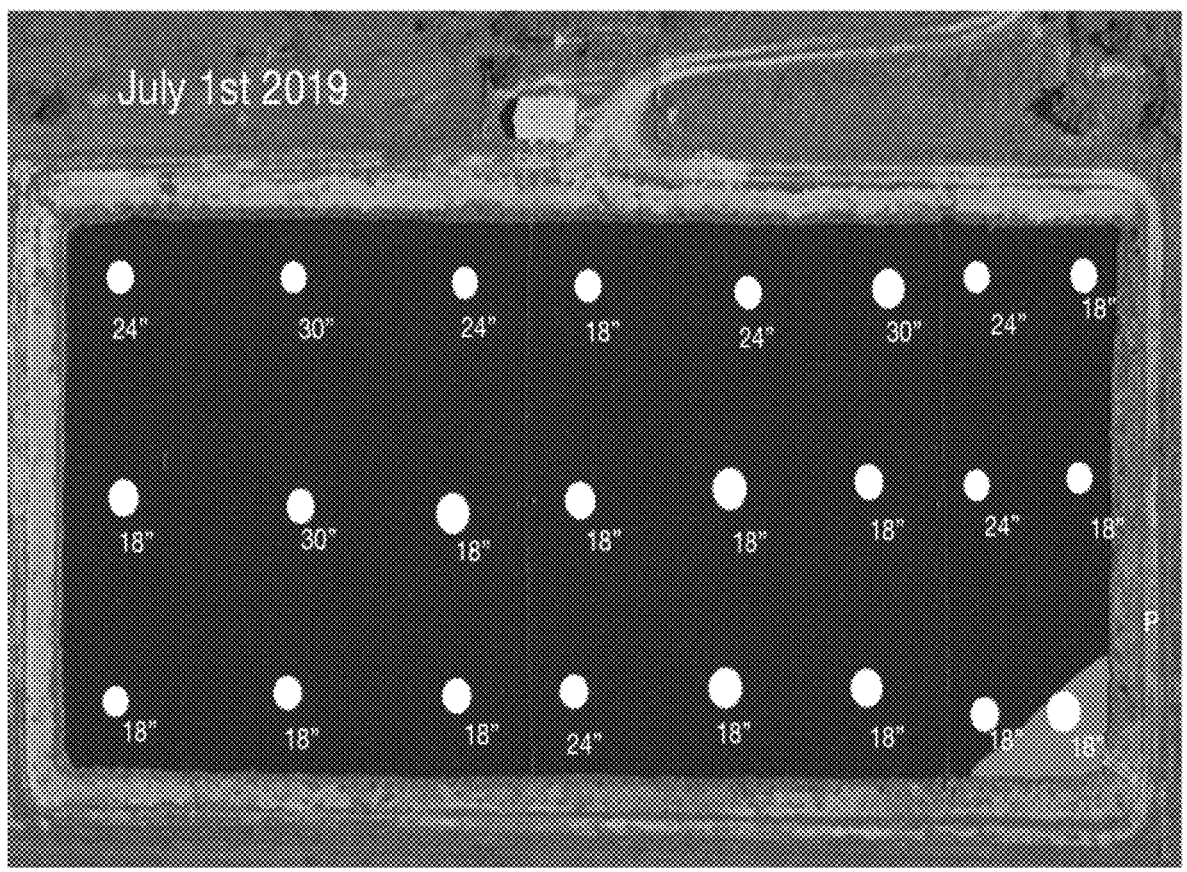
FIG. 2 is a schematic of the beginning sludge depth volume in each cell zone of the Kingdom City wastewater lagoon.

The amount of sludge that had accumulated in the Village of Kingdom City's partitioned lagoon cell had reached a level that required some type of remedial action. The need was urgent to reduce in the volume of accumulated sludge in the lagoon cells while simultaneously lowering the effluent parameters to the new MSOP levels. Applicants disclose, as illustrated in FIG. 2, the beginning sludge depth volume in each cell zone was recorded at various locations in side the three zoned cell. The initial sludge depth ranged from 30 inches to 18 inches across the lagoon.

Figure 3:
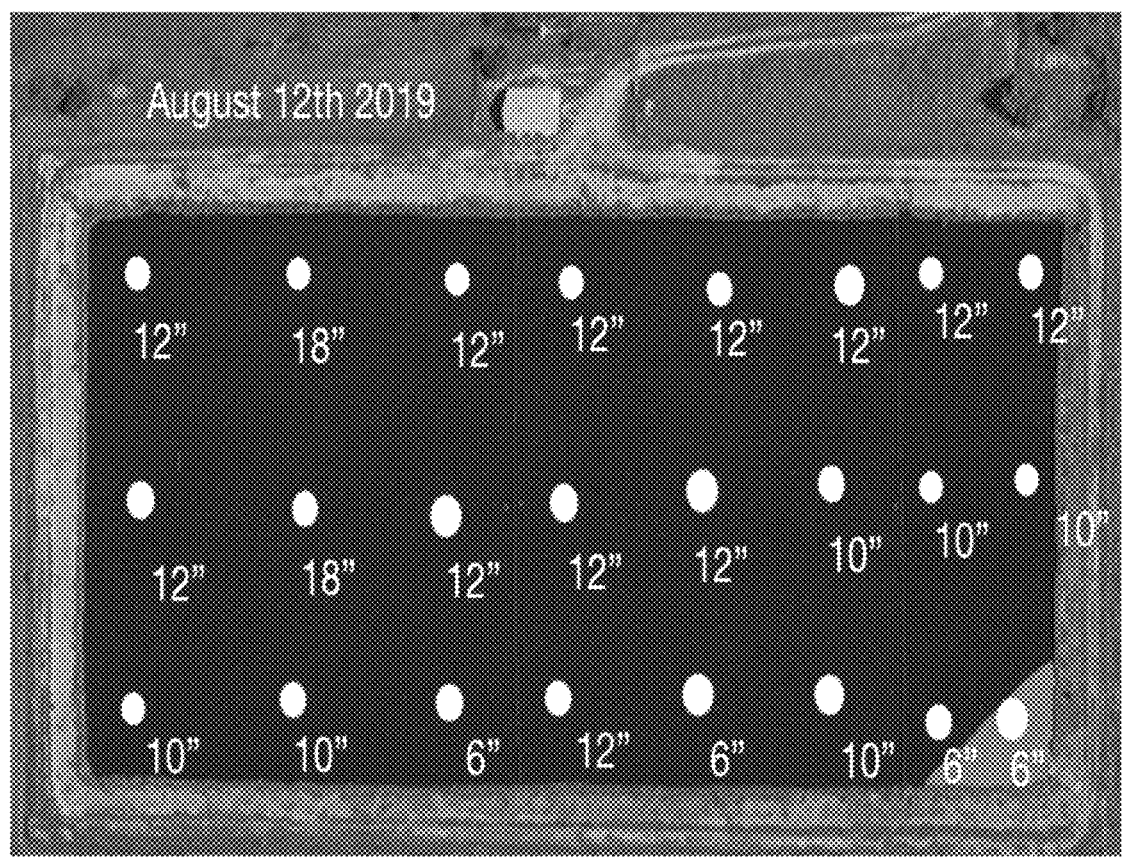
FIG. 3 is a schematic of the ending sludge depth volume in each cell zone of the Kingdom City wastewater lagoon.

The present invention, a batch of saturated non-pathogenic microbes, spores, unicellular organisms and enzymes were injected directly into the lagoon system comprising an influent stream and an effluent stream of wastewater. The saturated batch effectively digested contaminates within the wastewater which reduced the accumulated sludge volumes and lowered the levels of effluent pollutants in the activated sludge system. The data shows that the depth of accumulated sludge was reduce by plus or minus ten inches, as illustrated in FIG. 3. The treated sludge depth ranged from 18 inches to 6 inches after two months of treatment. This extreme reduction in sludge depth after a short period of time demonstrates the superior efficacy of the present invention.

Furthermore, the effluent samples from the lagoon system were collected and sampled by independent laboratories at the beginning and end of the trial. The changes in the effluent parameters were also unparalleled in superior efficacy of treatment results.

Figure 4:
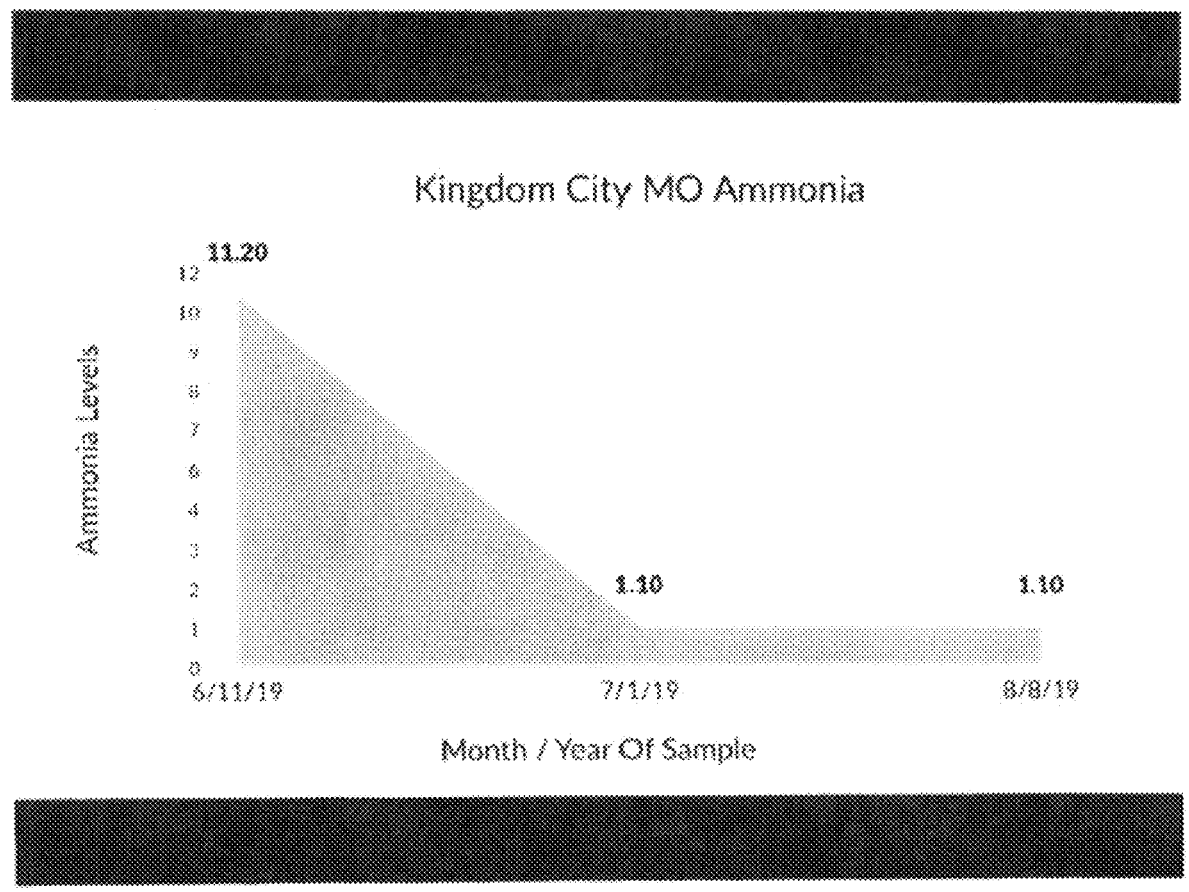
FIG. 4 is a graphic representation of the reduction in ammonia in Kingdom City.
Figure 5:
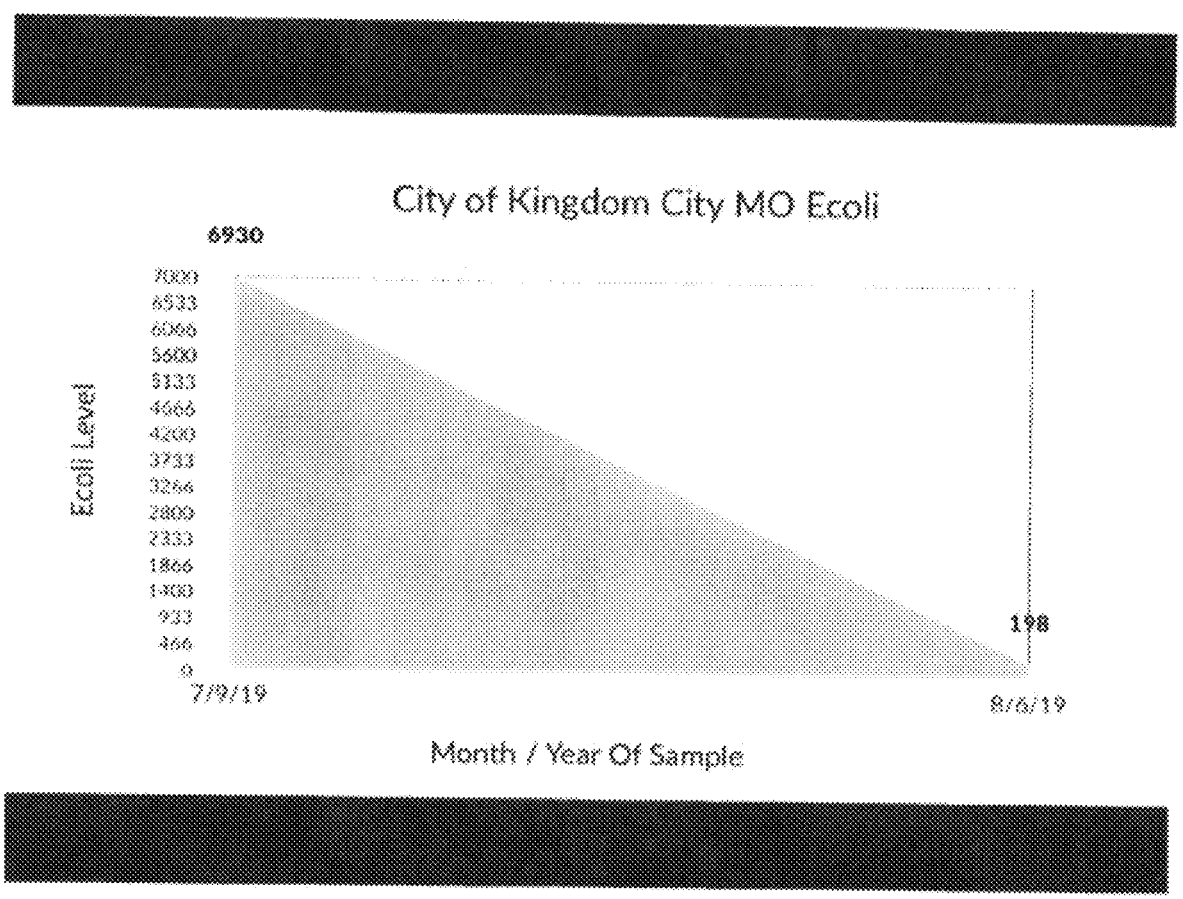
FIG. 5 is a graphic representation of the reduction in E. coli in Kingdom City.

As illustrated in FIG. 2 at the beginning of the trial, the lagoon effluent discharges were as follows: biochemical oxygen on demand (BOD) was 32-mg/L, suspended solids (SS) were 65-mg/L, ammonia was 11.2-mg/L, *E. coli* was 3,110-mpn/100 ml, with a pH of 8.0 units. The strong reduction in ammonia is illustrated in FIG. 4 and the extreme reduction in *E. coli* is illustrated in FIG. 5.

As evidenced by the pretrial lagoon discharge parameters, the lagoon was near a catastrophic level of pollutants. The city risked several harsh fines and penalties with the lagoon severely out of compliance. As a municipality with limited resources, the municipality needed a fast, economical, efficient solution to immediately bring the lagoon back into compliance. Industry standard treatments that involve complicated and expensive data collection and monitoring with expensive equipment would not provide the immediate relief needed to avoid the catastrophe. Taking several months to collect data to determine the exact microbes needed for this particular site to design a site-specific treatment plan was also not an option.

The present invention provided an immediate saturation blend of non-pathogenic microbes, spores, unicellular organisms and enzymes that instantly began treating the problematic effluent discharge issues. The treated lagoon in FIG. 3, two months post treatment with the present invention had an immediate reduction in discharge parameters as follows: biochemical oxygen on demand (BOD) was 8-mg/

L, suspended solids (SS) were 13-mg/L, ammonia was 1.1-mg/L, E. coli was 198-mpn/100 ml, with a pH of 7.4 units. FIG. 4 demonstrates the dramatic reduction in ammonia in the short treatment period. FIG. 5 demonstrates the dramatic reduction in E. coli in the short treatment period. Additionally, the data was gathered while the treatment process was still active.

The falling suspended solids data reveals that the accumulated sludge was being digested in-place and not being discharged from the outfall. The effectiveness of the saturated blend of the present invention is clear from the post-treatment data.

The post-treatment lagoon has substantially less sludge in the lagoon and the resulting effluent parameters post-treatment were lower than the MSOP limits that are required by law. The lagoon went from being substantially out of compliance and in danger of receiving extreme penalties and fines to exceeding minimum standards for effluent discharge parameters as defined by the governing authorities.

Figure 6:
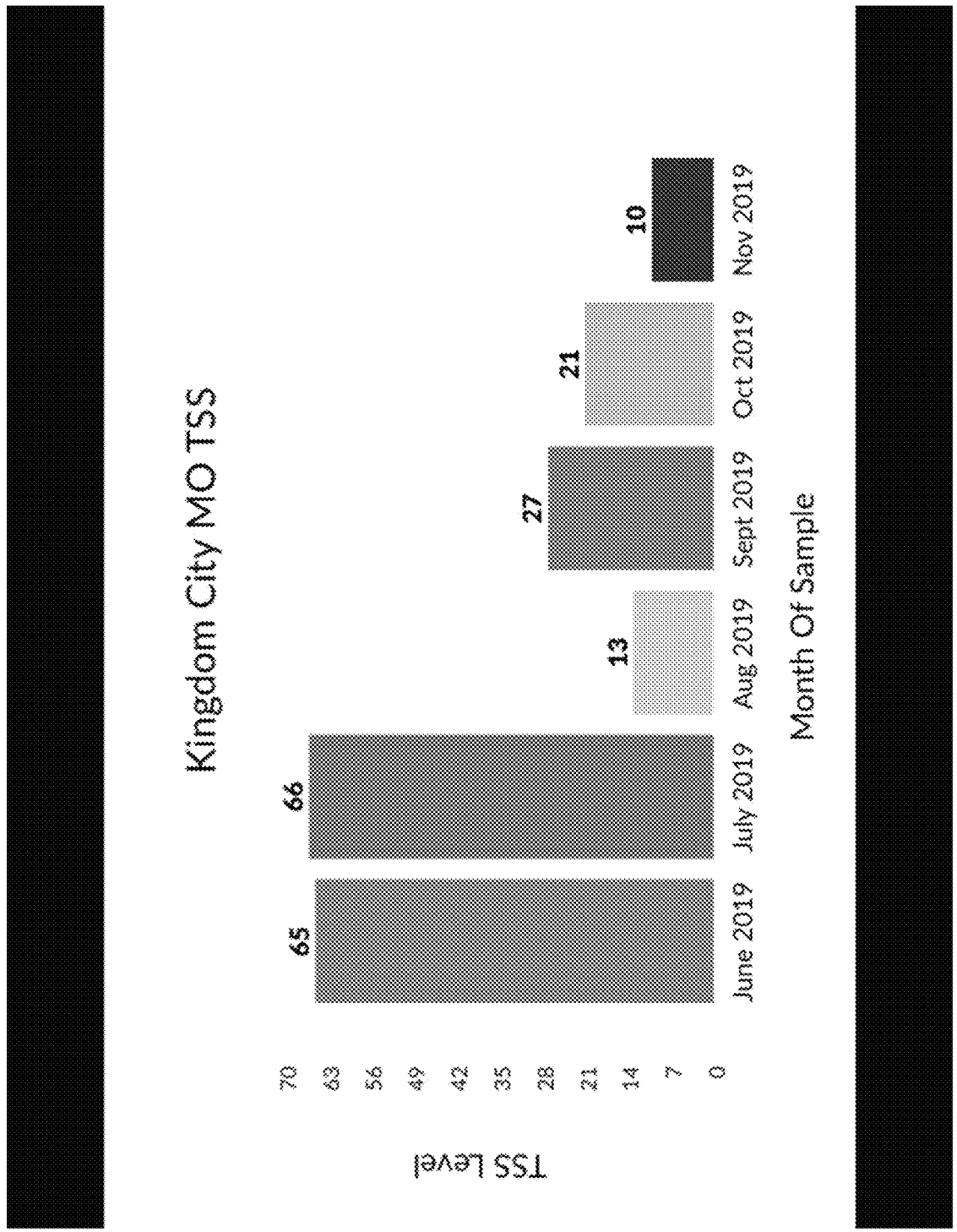
FIG. 6 is a graphic representation of the reduction in TSS in Kingdom City.

The suspended solids were additionally monitored for three more months after the initial data was gathered for continued data analysis. The results, demonstrated in FIG. 6 show the falling suspended solids data reveals that the accumulated sludge was being digested in-place and not discharged from the outfall. The overall change in suspended solids from initial treatment to six months of monitoring was a reduction of 55-mg/L. Treatment outcome was outstanding results on all effluent parameters as shown by the data.

Example 2: Kingsville, Missouri ran a clinical trial of the present invention on the City's wastewater treatment facility. Kingsville's existing Missouri State Operating Permit (MSOP) was expiring and the new MSOP discharge limits for Kingdom City were becoming more inclusive and more stringent than those of the current MSOP. The amount of sludge that accumulated in the Kingsville's partitioned lagoon cell had reached a level that required some type of immediate remedial action. The need was urgent to reduce in the volume of accumulated sludge in the lagoon cells while simultaneously lowering the effluent parameters to the new MSOP levels.

The municipality considered the construction of a new mechanical treatment system to address the problematic wastewater solution for the city because of the seriousness of the problem at hand. However, the local economy was feared to not be stable enough to justify building a very expensive new treatment system in the unfortunate event if the local economy could not sustain it. With seemingly all conventional options off the table due to budget constraints, the city decided to proceed with a trial treatment of the present invention comprises a saturated blend of non-pathogenic microbes, spores, unicellular organisms, and enzymes. The blend digests contaminates within the wastewater, which reduces accumulated sludge volumes and lowering the levels of effluent pollutants.

The beginning sludge depths and the resulting initial sludge volume in Kingsville's first lagoon cell was calculated as follows: The sludge depths were measured with a Sludge Judge and recorded at various locations inside Kingsville's lagoon. The lagoon was then treated with the present invention's blend of concentrated blend of non-pathogenic microbes, spores, unicellular organisms, and enzymes. The ending sludge depths were then measured and recorded again in the same manner as the beginning depths.

The Sludge Judge data collected shows that the depth of accumulated sludge was reduced by approximately 7-inches during a 30-day trial period. Substantial reduction of sludge was achieved in a mere 30 days with one application of the present invention. The success of the treatment is self-evident in the data. The results achieved are astounding in efficacy, easy of application, and cost of treatment.

A few short weeks prior to treatment, the municipality was considering building a new treatment facility as believed to be the only option to bring the city back into compliance. After one treatment of the present invention's saturated blend, the city is again in compliance. The cost savings of the treatment of the lagoon by the present invention are shocking when compared to the cost of building an entirely new treatment facility.

At the beginning of the trial, the lagoon effluent discharges were as follows: biochemical oxygen on demand (BOD) was 31-mg/L, suspended solids (SS) were 27-mg/L, ammonia was 11.5-mg/L, and E. coli was 387-mpn/100 ml. As evidenced by the pretrial lagoon discharge parameters, the lagoon was near a catastrophic level of pollutants. The city risked several harsh fines and penalties with the lagoon severely out of compliance. As a municipality with limited resources, the municipality needed a fast, economical, efficient solution to immediately bring the lagoon back into compliance. Industry standard treatments that involve complicated and expensive data collection and monitoring would not provide the immediate relief needed to avoid the catastrophe. Taking several months to collect data to determine the exact microbes needed for this particular site to design a site-specific treatment plan was also not an option.

The present invention provided an immediate saturation blend of non-pathogenic microbes, spores, unicellular organisms and enzymes that immediately began treating the problematic effluent discharge issues. The treated lagoon after injected with the present invention of saturated blend had an immediate reduction in discharge parameters as follows: biochemical oxygen on demand (BOD) was 23-mg/L, suspended solids (SS) were 85-mg/L, ammonia was 0.66-mg/L, and E. coli was 55-mpn/100 ml.

Figure 7:
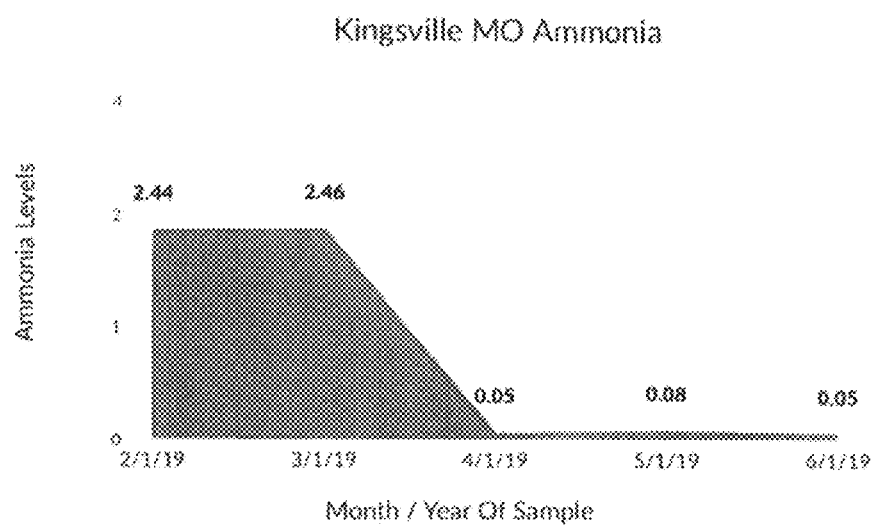
FIG. 7 is a graphic representation of the reduction in ammonia in Kingsville.
Figure 8:
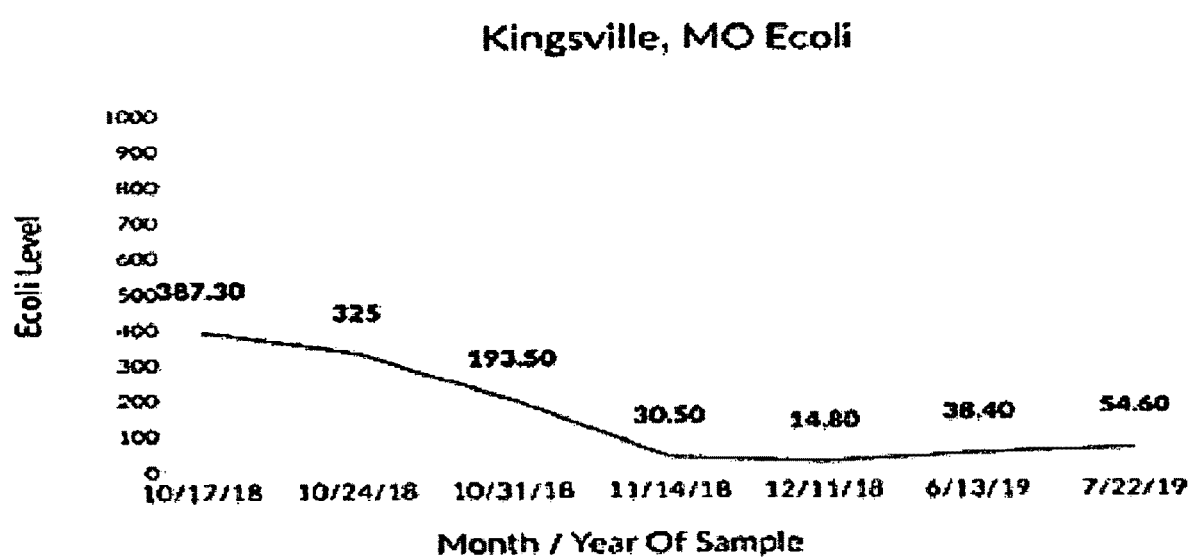
FIG. 8 is a graphic reorientation of the reduction in E. coli in Kingsville.

FIG. 7 demonstrates the dramatic reduction in ammonia in the short treatment period. FIG. 8 demonstrates the dramatic reduction in E. coli in the short treatment period. Additionally, the data was gathered while the treatment process was still active. The falling suspended solids data reveals that although the level was somewhat elevated by an algae bloom, the accumulated sludge was being digested in-place and not being discharged from the outfall. The effectiveness of the saturated blend of the present invention is clear from the post-treatment data.

One skilled in the art would understand that the fermentation process and saturated blends can be used for multiple cycles, more or less often, daily, weekly, or at the discretion of the user.

One skilled in the art would understand that the fermentation process and saturated blends can be used to treat contaminates on land, sewer systems, wet wells, soil contamination, and any variety of liquid to name a few examples.

One skilled in the art would also understand that the features, benefits, and example are used throughout the application as illustrations only and not meant to be an exhaustive list of apparatus capabilities.

Disclosed are numerous embodiments of a fermentation system, biological standard saturated blend, and customizable biological saturated blend that is a vast improvement in form, function, and efficacy which is an easy to apply economical product.

It should be noted and understood that various changes and modifications to the described preferred embodiments herein will be evident to those skilled in the art. Such changes and modifications can be made without deserting from the spirit and scope of the present invention and without weakening its intended advantages. It is therefore intended that all or any such changes and modifications be enclosed by the appended claims.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶6.

The invention claimed is:

1. A method of treating wastewater in a wastewater treatment plant using microbes, while maximizing volume by unit concentration of the microbes in a treatment batch and minimizing the growth phase of the microbes, the method comprising:
   a. providing a fermentation system comprising a bioreactor system comprising:
      at least one bioreactor tank for treating wastewater in the wastewater treatment plant, wherein the wastewater contains pollutants, the wastewater treatment plant has an influent stream and an effluent stream of wastewater,
   an air compressor system comprising:
      a gas transfer system;
      a piping system to allow air to exhaust outside the bioreactor tank;
      a mixing apparatus;
      a transfer line system, and
      a pump for transferring the treatment batch out of said at least one bioreactor tank;
   b. adding an inoculum comprising grown microbes, microbial seeds, nutrients and water to the at least one bioreactor tank, wherein the inoculum contains a primary concentration of grown microbes comprising at least one of component A, B, or C, wherein component A comprises aerobic species in an amount of 10% to 40% by seed volume of the microbial seeds, component B, wherein component B comprises facultative species in an amount of 10% to 40% by seed volume of the microbial seeds, and component C, wherein component C comprises anaerobic species in an amount of 10% to 40% by seed volume of the microbial seeds;
   c. growing the microbial seeds mixed with grown microbes in the at least one bioreactor tank to produce a secondary treatment batch wherein the microbes growth rate has peaked, wherein the secondary treatment batch contains a higher concentration of microbes than the primary concentration of microbes, wherein the secondary treatment batch is at least 3,200 times larger in volume by unit concentration of microbes than the primary concentration of microbes; applying an amount of the secondary treatment batch to the wastewater for treating wastewater in a wastewater treatment plant, wherein the secondary treatment batch to the wastewater provides a microbe concentration in the wastewater of at least 300,000,000 cfu/ml; whereby the secondary treatment batch bypasses a need for a growth phase of biomass in the wastewater;
   d. whereby the secondary treatment batch reduces the pollutants in the wastewater, without the need for a growth phase of a biomass in the wastewater; wherein the effluent stream has lower pollutants than the influent stream.

2. The method set forth in claim 1 wherein the wastewater treatment plant comprises a single pass lagoon system, and wherein the secondary treatment batch is directly applied to wastewater in the single pass lagoon.

3. The method set forth in claim 1 wherein the wastewater treatment plant comprises an activated sludge system, and wherein the secondary treatment batch is directly applied to wastewater in the activated sludge system.

4. The method of claim 1, wherein the wastewater is municipal wastewater.

5. The method of claim 1, wherein the bioreactor system is onsite at the wastewater treatment plant.

6. The method of claim 1, whereby the bioreactor system is monitored and controlled from an offsite location.

7. A method of reducing pollutants in a wastewater at a wastewater treatment plant, wherein the method is performed on-site at the wastewater treatment plant, whereby a need for addition of supplemental nutrients to the wastewater is eliminated, the method comprising:
   a. providing a system for growing of microbes comprising a tank, an input for water, an output for a treatment batch, a mixing apparatus, and an air flow control apparatus;
   b. depositing nutrients, water, microbial seeds, and grown microbes into the system, whereby a primary concentration of grown microbes, comprising at least one of component A, B or C, wherein component A comprises aerobic species in an amount of 10% to 40% by seed volume of the microbial seeds, component B, wherein component B comprises facultative species in an amount of 10% to 40% by seed volume of the microbial seeds, and component C, wherein component C comprises anaerobic species in an amount of 10% to 40% by seed volume of the microbial seeds;
   c. growing the microbial seeds in the system to provide a treatment batch comprising the microbes in a secondary concentration, wherein the secondary concentration is defined as the treatment batch and is at least 3,200 times larger in volume by unit concentration of microbes the primary concentration; and,
   d. applying the treatment batch to the wastewater to provide a total microbe concentration in the wastewater of at least 300,000,000 cfu/ml, h
   e. wherein the microbes reduce the pollutants in the wastewater as measured by at least one of parameters including biochemical oxygen on demand, suspended solids, ammonia, or *E. coli* and whereby the pollutants in the wastewater are reduced without the need for the addition of supplemental nutrients to the wastewater.

8. The method of claim 7, whereby the treatment batch microbes applied to the wastewater reduce the pollutants in the wastewater, without the need for a growth phase of a biomass in the wastewater.

9. The method of claim 7, wherein the wastewater treatment plant comprises a single pass lagoon system, and wherein the treatment batch is directly applied to wastewater in the single pass lagoon.

10. The method of claim 7, wherein the wastewater treatment plant comprises an activated sludge system, and wherein the treatment batch is directly applied to wastewater in the activated sludge system.

11. A method of reducing pollutants in wastewater by growing microbes and applying the microbes to a wastewater in a wastewater treatment plant, the method comprising:
   a. providing a bioreactor system for wastewater treatment at a wastewater treatment plant, the wastewater treatment plant having wastewater having pollutants, the wastewater treatment plant having an influent stream and an effluent stream of wastewater;

b. the bioreactor system comprising; a tank comprising a mixing apparatus and a pump;

c. adding water to the tank; adding nutrients to the tank; adding an inoculum comprising microbial seed and microbes to the tank, whereby the inoculum in the tank has a primary concentration of the grown microbes, comprising at least one of component A, B, or C, wherein component A comprises aerobic species in an amount of 10% to 40% by seed volume of the microbial seeds, component B, wherein component B comprises facultative species in an amount of 10% to 40% by seed volume of the microbial seeds, and component C, wherein component C comprises anaerobic species in an amount of 10% to 40% by seed volume of the microbial seeds;

d. growing the inoculum thereby increasing the volume of microbes, wherein the grown mixture of microbes in the tank define a treatment batch;

e. wherein the treatment batch has a volume of microbes that is 3,200 larger in volume by unit concentration of microbes than the primary concentration of microbes;

f. applying the treatment batch to the wastewater, wherein the treatment batch to the wastewater provides a total microbe concentration in the wastewater of at least 300,000,000 cfu/ml, whereby the microbes in the treatment batch reduce the pollutants in the wastewater, wherein the effluent stream has lower pollutants than the influent stream, wherein, sufficient numbers of microbes are introduced into the wastewater to reduce the pollutants while minimizing the need for addition of supplemental nutrients to the wastewater.

12. The method of claim 11, wherein sufficient amount of treatment batch is introduced into the wastewater to reduce the pollutants while minimizing the need for a growth phase of a biomass in the wastewater.

13. The method of claim 11, wherein the wastewater treatment plant comprises a single pass lagoon system, and wherein the treatment batch is directly applied to wastewater in the single pass lagoon.

14. The method of claim 11, whereby the bioreactor system is onsite at the wastewater treatment plant.

15. The method of claim 11, wherein the bioreactor system is monitored and controlled from an offsite location.

* * * * *